(12) United States Patent
Lim et al.

(10) Patent No.: US 9,652,073 B2
(45) Date of Patent: May 16, 2017

(54) ANTENNA DEVICE AND ELECTRONIC DEVICE HAVING THE SAME

(71) Applicant: Samsung Electronics Co., Ltd., Suwon-si (KR)

(72) Inventors: Sang-Ho Lim, Suwon-si (KR); Seung-Tae Ko, Bucheon-si (KR); Yoon-Geon Kim, Busan (KR); Won-Bin Hong, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 27 days.

(21) Appl. No.: 14/926,536

(22) Filed: Oct. 29, 2015

(65) Prior Publication Data
US 2016/0126614 A1    May 5, 2016

(30) Foreign Application Priority Data
Oct. 29, 2014  (KR) .................. 10-2014-0148622

(51) Int. Cl.
| | | |
|---|---|---|
| *H01Q 1/00* | (2006.01) | |
| *G06F 3/041* | (2006.01) | |
| *H01Q 1/36* | (2006.01) | |
| *G06F 3/044* | (2006.01) | |
| *H01Q 1/24* | (2006.01) | |
| *H01Q 1/44* | (2006.01) | |

(52) U.S. Cl.
CPC .......... *G06F 3/0416* (2013.01); *G06F 3/044* (2013.01); *H01Q 1/243* (2013.01); *H01Q 1/36* (2013.01); *H01Q 1/44* (2013.01)

(58) Field of Classification Search
CPC .. H01Q 1/00; H01Q 1/44; H01Q 1/22; H01Q 1/24; H01Q 1/36
USPC ........................................................ 343/720
See application file for complete search history.

(56) References Cited

U.S. PATENT DOCUMENTS

| | | | |
|---|---|---|---|
| 6,452,549 B1 | 9/2002 | Lo | |
| 6,876,320 B2 * | 4/2005 | Puente Baliarda .. | H01Q 15/145 342/12 |
| 7,868,843 B2 * | 1/2011 | Borau ................... | H01Q 1/246 343/700 MS |
| 8,738,103 B2 * | 5/2014 | Puente Baliarda .... | H01Q 1/243 455/575.7 |

(Continued)

FOREIGN PATENT DOCUMENTS

WO    WO2009085777    7/2009

OTHER PUBLICATIONS

International Search Report mailed Feb. 26, 2016 corresponding to International Application No. PCT/KR2015/011380.

(Continued)

*Primary Examiner* — Huedung Mancuso
(74) *Attorney, Agent, or Firm* — McAndrews, Held & Malloy, Ltd.

(57) ABSTRACT

Provided are various embodiments related to an electronic device including an antenna device. According to an embodiment, an antenna device embedded in a display includes a film member provided between a plurality of display layers and multiple antenna portions including mesh-grid regions provided on the film member, in which a gap is formed between the multiple antenna portions such that the mesh-grid regions are discontinuously disposed in a spaced-apart relation. Other embodiments may also be possible.

21 Claims, 12 Drawing Sheets

(56) References Cited

U.S. PATENT DOCUMENTS

| | | |
|---|---|---|
| 2005/0062725 A1 | 3/2005 | Shih |
| 2009/0051620 A1 | 2/2009 | Ishibashi et al. |
| 2009/0201156 A1 | 8/2009 | Kato |
| 2011/0183721 A1 | 7/2011 | Hill et al. |
| 2011/0298670 A1 | 12/2011 | Jung et al. |
| 2012/0157024 A1* | 6/2012 | Tsukagoshi .......... H04B 5/0031 455/129 |
| 2014/0139379 A1* | 5/2014 | Bolin ....................... H01Q 9/06 343/702 |

OTHER PUBLICATIONS

Written Opinion of the International Searching Authority mailed Feb. 26, 2016 corresponding to International Application No. PCT/KR2015/011380.

* cited by examiner

ANTENNA DEVICE AND ELECTRONIC DEVICE HAVING THE SAME

RELATED APPLICATION

This application claims priority under 35 U.S.C. §119(a) to Korean Patent Application Serial number 10-2014-0148622, which was filed on Oct. 29, 2014 in the Korean Intellectual Property Office, the entire disclosure of which is hereby incorporated by reference.

BACKGROUND

Various embodiments of the present disclosure relate to an antenna device that implements a wireless communication function and an electronic device having the antenna device.

Wireless communication techniques have been implemented in a variety of ways including commercialized mobile communication network connection, and recently, a wireless Local Area Network (w-LAN) represented by Wireless-Fidelity (Wi-Fi), Bluetooth, Near Field Communication (NFC), and so forth. A mobile communication service, evolving from the 1st-Generation (1G) mobile communication service focusing on voice communication to the 4th-Generation (4G) mobile communication network, provides Internet and multimedia services. A future next-generation mobile communication service is expected to be provided in ultra-high frequency bands over several tens of GHz. For example, a mobile communication terminal complying with Long Term Evolution (LTE) based on the 3rd Generation Partnership Projection (3GPP) commonly used around the world as one of leading standards of the 4G mobile communication basically supports bands of 700 MHz-960 MHz and 2.5 GHz-2.7 GHz.

As communication standards such as short-range wireless communication or Bluetooth have been activated, electronic devices, for example, mobile communication terminals, have mounted antenna devices operating in various different frequency bands. For example, a 4G mobile communication service operates in frequency bands of 700 MHz, 1.8 GHz, 2.1 GHz, and so forth, Wi-Fi, although slightly varying with rules, operates in frequency bands of 2.4 GHz, 5 GHz, and the like, and Bluetooth operates in a frequency band of 2.45 GHz.

A mobile communication terminal also needs an antenna device to enable wireless communication. The antenna device is installed and sufficiently spaced apart from the other circuit devices to suppress interference with the other circuit devices during transmission and reception of a high-frequency signal. The antenna device is embedded in the mobile communication terminal.

The antenna device has requirements including superior radiation performance and large bandwidth in a small volume to meet the design tendency of the mobile communication terminal towards slimness and smaller sizes. In particular, for an embedded antenna device, the key point of antenna design is achieving superior radiation performance without changing the overall size of the antenna device, because the space for mounting the antenna device in the mobile communication terminal is becoming smaller and smaller.

Thus, a technique for including an antenna device in a display of the mobile communication terminal has been developed. Herein, the display may be usually implemented with a touch panel.

However, when the antenna device is embedded in the touch panel of the mobile communication terminal, a touch function of the touch panel and a radiation performance of the antenna device degrade.

That is, when the antenna device is inserted into the touch panel, touch sensitivity degrades due to the formation of additional capacitance. Radiation performance, one of the most important factors of an antenna, also degrades.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure have been made to at least partially solve, alleviate, or remove at least one of the problems or disadvantages described above.

Various aspects of the present disclosure provide an antenna device having multiple antenna portions in which a gap is formed such that mesh-grid regions are discontinuously disposed in a spaced-apart relation in a display, thereby preventing a touch function of a display and radiation performance of an antenna from degrading. Accordingly, various aspects of the present disclosure provide an electronic device having the antenna device.

Other objects to be provided in the present disclosure may be understood by embodiments described below.

According to an aspect of the present disclosure, there is provided an antenna device embedded in a display, the antenna device including a film member provided between a plurality of display layers and multiple antenna portions including mesh-grid regions provided on the film member, in which a gap is formed between the multiple antenna portions such that the mesh-grid regions are discontinuously disposed in a spaced-apart relation.

According to another aspect of the present disclosure, there is provided an antenna device embedded in a display, the antenna device includes a film member provided on the display, multiple first antenna portions provided on a top surface of the film member to include mesh-grid regions having a linear or curved direction and multiple second antenna portions provided on the top surface of the film member to include mesh-grid regions having a right angle with respect to or being inclined at a predetermined angle with respect to the top surface of the film member. Further, there is provided a first connection portion and a second connection portion configured to electrically connect the first antenna portions with the second antenna portions, in which a gap is formed between the first antenna portion and the second antenna portion such that the mesh-grid regions are discontinuously disposed in a spaced-apart relation.

According to another aspect of the present disclosure, there is provided an antenna device embedded in a display, the antenna device including a film member provided on the display, multiple first antenna portions provided on a top surface of the film member to include mesh-grid regions having a linear or curved direction and multiple second antenna portions provided on a bottom surface of the film member to include mesh-grid regions having a right angle with respect to or being inclined at a predetermined angle with respect to the top surface of the film member. Further, there is provided a first connection portion and a second connection portion configured to electrically connect the first antenna portions with the second antenna portions, in which the first and second antenna portions discontinuously dispose the mesh-grid regions in a spaced-apart relation on the top surface and the bottom surface of the film member.

According to another aspect of the present disclosure, there is provided an electronic device including an antenna device, the electronic device including a film member provided on a display of the electronic device, multiple first antenna portions provided on a top surface of the film member to include mesh-grid regions having a linear or curved direction, multiple second antenna portions provided on the top surface of the film member to include mesh-grid regions having a right angle with respect to or being inclined at a predetermined angle with respect to the top surface of the film member. Further, there is provided a first connection portion and a second connection portion configured to electrically connect the first antenna portions with the second antenna portions, in which a gap is formed between the first antenna portion and the second antenna portion such that the mesh-grid regions are discontinuously disposed in a spaced-apart relation.

According to another aspect of the present disclosure, there is provided an electronic device including an antenna device, the electronic device including a film member provided on a display of the electronic device and multiple first antenna portions provided on a top surface of the film member to include mesh-grid regions having a linear or curved direction, multiple second antenna portions provided on a bottom surface of the film member to include mesh-grid regions having a right angle with respect to or being inclined at a predetermined angle with respect to the top surface of the film member. Further, there is provided a first connection portion and a second connection portion configured to electrically connect the first antenna portions with the second antenna portions, in which the first and second antenna portions discontinuously dispose the mesh-grid regions in a spaced-apart relation on the top surface and the bottom surface of the film member.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
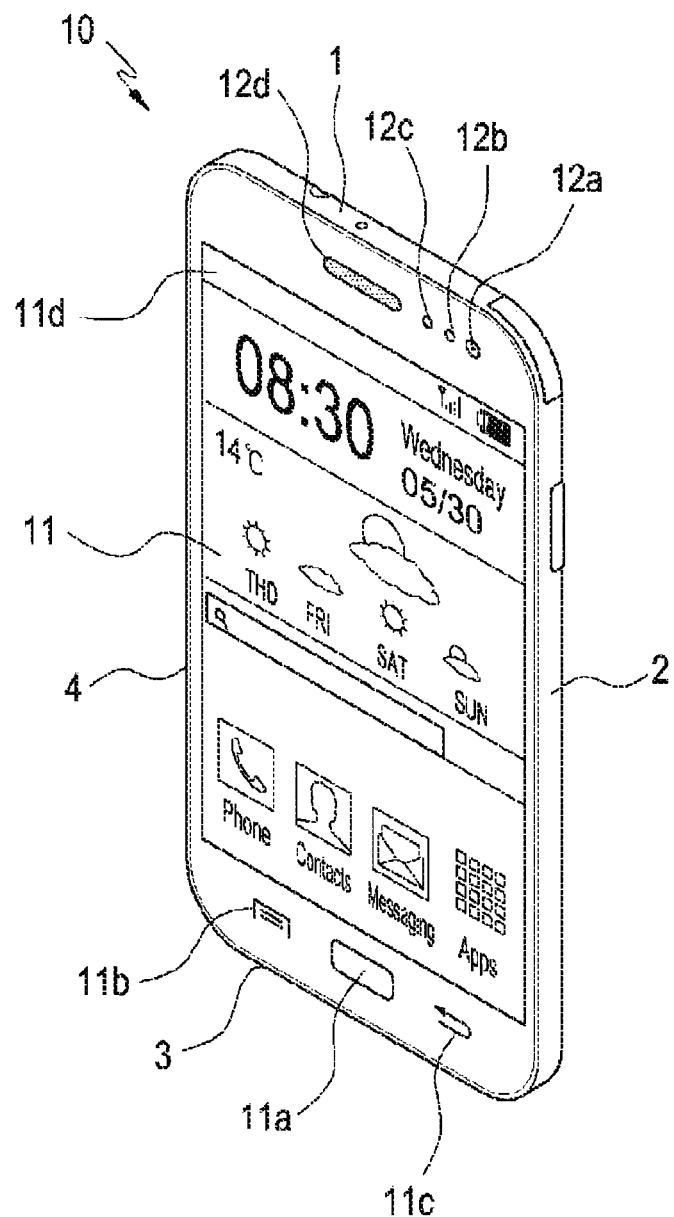
FIG. 1 is a perspective view showing a front surface of an electronic device including an antenna device according to various embodiments of the present disclosure.

Hereinafter, terms used in various embodiments of the present disclosure will be described in brief and various embodiments of the present disclosure will be described in detail.

Terms and functions used in the present disclosure are mostly normal terms that are presently widely used, but these terms may vary depending on an operator's intention or a precedent, or emergence of a new technique. In some cases, a term that is arbitrarily selected by an applicant exists, and in this case, a meaning thereof will be described in detail in a corresponding description of various embodiments of the present disclosure. Thus, terms used in various embodiments of the present disclosure should be defined based on the meanings thereof and the entire contents of the various embodiments of the present disclosure, rather than simply based on the name thereof.

While terms including ordinal numbers, such as "first" and "second", or the like, may be used to describe various components, such components are not limited to the above terms. The above terms are used only to distinguish one component from another. For example, a first component may be referred to as a second component without departing from the scope of rights of the present invention, and likewise a second component may be referred to as a first component.

Herein, an electronic device connected to an audio device according to various embodiments of the present disclosure will be described. First, applications of the electronic device according to an embodiment of the present disclosure includes any mobile communication terminals operating based on communication protocols corresponding to various communication systems and any information communication devices, multimedia devices, application devices thereof such as a video phone, an electronic book (e-book) reader, a laptop PC, a netbook computer, a Personal Digital Assistant (PDA), a Portable Multimedia Player (PMP), an MP3 player, mobile medical equipment, an electronic bracelet, an electronic necklace, an electronic accessory, a camera, a wearable device (e.g., a Head-Mounted Device (HMD) such as electronic glasses), an electronic cloth, an electronic bracelet, an electronic necklace, an electronic accessory, an electronic tattoo, and a smart watch.

According to some embodiments, the electronic device may be a smart home appliance. The electronic device may include, for example, a Television (TV), a Digital Video DisC (DVD) player, audio equipment, a refrigerator, an air conditioner, a vacuum cleaner, an oven, a microwave oven, a laundry machine, an air cleaner, a set-top box, a TV box (e.g., Samsung HomeSync™, Apple TV™, or Google TV™), a game console, an electronic dictionary, an electronic key, a camcorder, and an electronic frame.

According to some embodiments, the electronic device may include at least one of various medical equipment (e.g., a Magnetic Resonance Angiography (MRA), Magnetic Resonance Imaging (MRI), Computed Tomography (CT), an imaging device, or an ultrasonic device), a navigation system, a Global Positioning System (GPS) receiver, an Event Data Recorder (EDR), a Flight Data Recorder (FDR), a vehicle infotainment device, electronic equipment for ships (e.g., navigation system and gyro compass for ships), avionics, a security device, a vehicle head unit, an industrial or home robot, an Automatic Teller's Machine (ATM), or a Point of Sales (POS).

According to some embodiments, the electronic device may include a part of a piece of furniture, a portion of a building/structure, an electronic board, an electronic signature receiving device, a projector, and various measuring instruments (e.g., a water, electricity, gas, or electric wave measuring device).

The electronic device according to various embodiments of the present disclosure may be one of the above-listed devices or a combination thereof. The electronic device according to various embodiments of the present disclosure may be a flexible device. It will be obvious to those of ordinary skill in the art that the electronic device according to various embodiments of the present disclosure is not limited to the above-listed devices.

According to some embodiments of the present disclosure, an electronic device may include at least one of furniture, a portion of a building/structure, an electronic board, an electronic signature receiving device, a projector, and various measuring devices (e.g., devices for measuring tap water, electricity, gas, or a radio wave), which have a communication function.

An electronic device according to various embodiments of the present disclosure may be a combination of one or more of the above-described various devices. The electronic device according to various embodiments of the present disclosure may be a flexible device. Furthermore, it would be obvious to a person skilled in the art that the electronic device according to various embodiments of the present invention are not limited to the above-described various devices.

Figure 2:
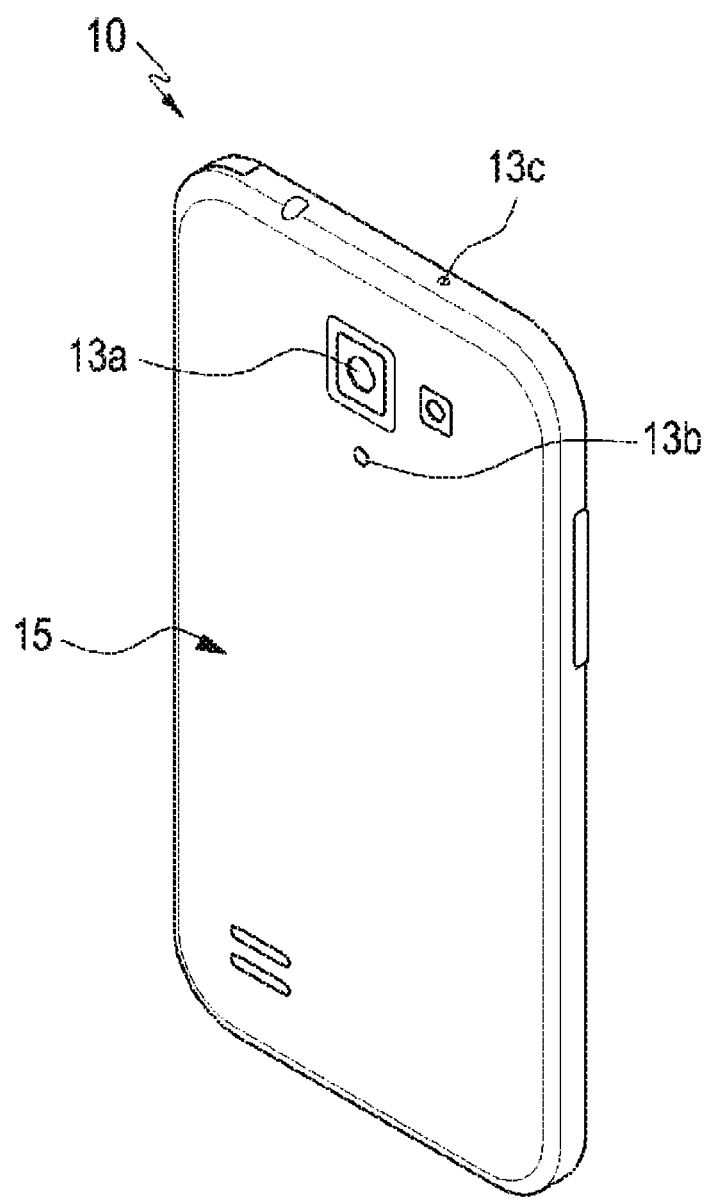
FIG. 2 is a perspective view showing a rear surface of an electronic device including an antenna device according to various embodiments of the present disclosure.

FIG. 1 is a perspective view showing a front surface of an electronic device. FIG. 2 is a perspective view showing a rear surface of an electronic device (e.g., an electronic device). The electronic device may be a smartphone or a tablet Personal Computer (PC). Referring to FIGS. 1 and 2, a configuration of an electronic device such as a smartphone will be described.

As shown in FIG. 1, a touch screen 11 is disposed in the center of a front surface of the electronic device 10. The touch screen 11 is formed to occupy most of the front surface of the electronic device 10. FIG. 1 shows an example in which a main home screen is displayed on the touch screen 11. The main home screen is an initial screen displayed on the touch screen 11 when the electronic device 10 is powered on. When the electronic device 10 has different home screens of several pages, the main home screen is the first home screen among the home screens of the several pages. Shortcut icons for executing frequently used applications, a main menu change key, time, weather, and so forth are displayed on the home screen. The main menu change key may be used to display a menu screen on the touch screen 11. A status bar 11d indicating a state, such as a battery charge state, strength of a received signal, and a current time, is formed in an upper portion of the touch screen 11.

A home button 11a, a menu button 11b, and a back button 11c are disposed in a lower portion of the touch screen 11.

The home button 11a is intended to display the main home screen on the touch screen 11. For example, when any home screen, which is different from the main home screen, or a menu screen is displayed on the touch screen 11, the main home screen is displayed on the touch screen 11 upon selection of the home button 11a. If the home button 11a is selected during execution of applications on the touch screen 11, the main home screen is displayed on the touch screen 11. The home button 11a is used to display recently used applications or a task manager on the touch screen 11.

The menu button 11b provides a connection menu that is displayed on the touch screen 11. The connection menu includes, for example, a widget add menu, a background change menu, a search menu, an edit menu, and an environment-setting menu.

The back button 11c is used to display a screen that was displayed immediately before the currently executed screen or to terminate the most recently used application.

According to various embodiments of the present disclosure, the first camera 12a, an illumination sensor 12b, and a proximity sensor 12c are disposed on an edge of the front surface of the electronic device 10 in FIG. 1. The second camera 13a, the flash 13b, and the speaker 13c are disposed on a rear surface of the electronic device 10 in FIG. 2.

If a battery pack is configured to be removable from the electronic device 10, the bottom surface of the electronic device 10 may be a removable battery cover 15.

The electronic device to be described below may include any one of a laptop computer, a netbook, a smartphone, a tablet Personal Computer (PC), a Galaxy Tab, and an iPad.

A metallic frame may be provided around the circumference of the touch screen 11 to prevent an edge portion of the touch screen from being damaged by shock.

Figure 3:
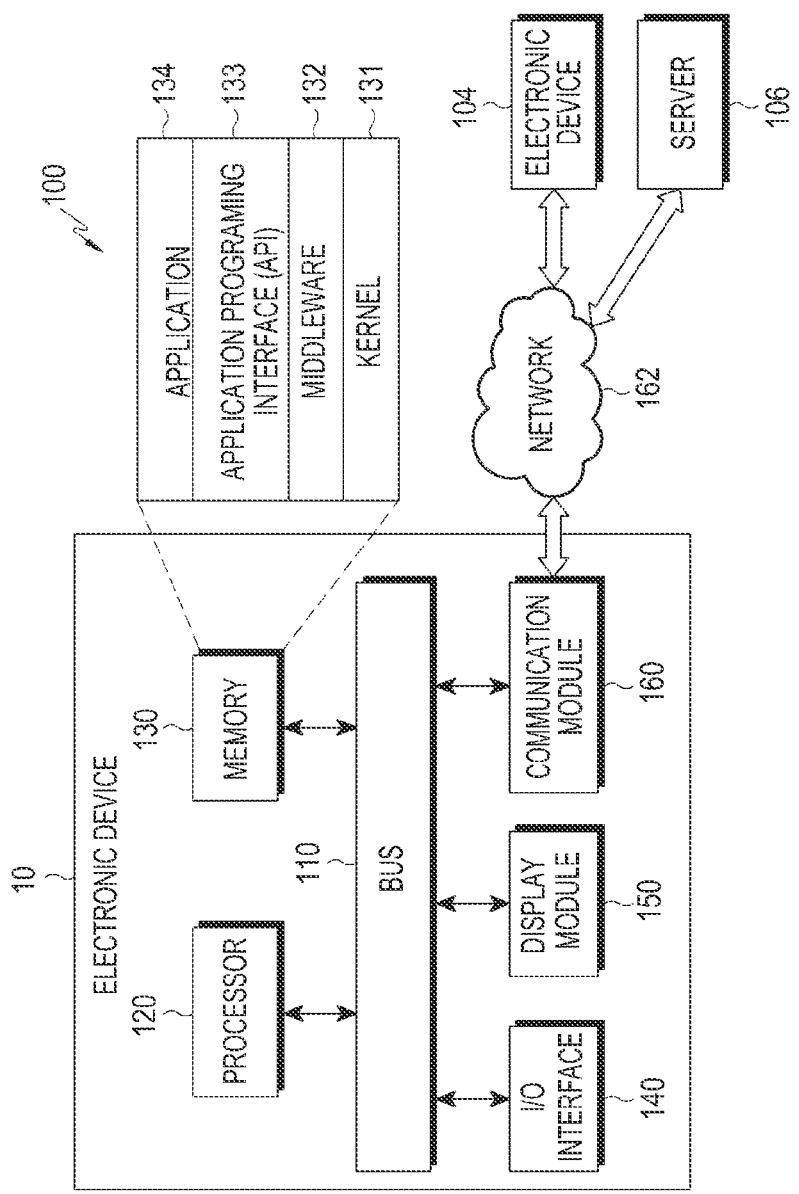
FIG. 3 is a block diagram of a network environment including an electronic device according to various embodiments of the present disclosure.

FIG. 3 is a block diagram of a network environment 100 including an electronic device 10 according to various embodiments of the present disclosure.

Referring to FIG. 3, an electronic device 10 in a network environment 100 according to various embodiments of the present disclosure will be described. The electronic device 10 may include a bus 110, a processor 120, a memory 130, an Input/Output (I/O) interface 140, a display module 150, and a communication module 160. The bus 110 is a circuit for interconnecting the components of an electronic device 10 and for allowing communication (e.g., a control message) between the components described above.

The processor 120 receives a command from other components (e.g., the memory 130, the I/O interface 140, the display 150, and the communication module 160) through the bus 110, decrypts the received command, and performs an operation or processes data according to the decrypted command.

The memory 130 stores a command or data received from or generated by the processor 120 or other components (e.g., the input/output interface 140, the display module 150, and the communication module 160). The memory 130 may include programming modules, for example, a kernel 131, a middleware 132, an Application Programming Interface (API) 133, or at least one application 134. These programming modules may include software, firmware, hardware, or a combination of at least two of them.

The kernel 131 controls or manages system resources (e.g., the bus 110, the processor 120, and the memory 130) used to execute an operation or a function implemented in the other programming modules, for example, the middleware 132, the API 133, and the at least one application 134. The kernel 131 provides an interface through which the middleware 132, the API 133, or the at least one application 134 accesses a separate component of the electronic device 10 to control the separate component.

The middleware 132 performs a relay operation such that the API 133 or the at least one application 134 exchanges data in communication with the kernel 131. The middleware 132 controls (e.g., scheduling or load balancing) task requests received from the at least one application 134, by using a method of assigning a priority for using a system resource (e.g., the bus 110, the processor 120, or the memory 130) of the electronic device 10 to, for example, at least one of the applications 134.

The API 133 is an interface through which the at least one application 134 controls a function provided by the kernel 131 or the middleware 132, and may include at least one interface or function (e.g., command) for, for example, file control, window control, image processing or character control.

According to various embodiments of the present disclosure, the at least one application 134 may include a Short Message Service (SMS)/Multimedia Messaging Service (MMS) application, an e-mail application, a calendar application, an alarm application, a healthcare application (e.g., an application for measuring an exercise volume or a blood sugar level), or an environment information application (e.g., an application for providing air pressure, humidity, or temperature information). Additionally or alternatively, the at least one application 134 may include an application associated with information exchange between the electronic device 10 and the external electronic device 104. The application associated with information exchange may include a notification relay application for relaying particular information to the external electronic device 104 or a device management application for managing the external electronic device 104.

For example, the notification relay application may include a function of relaying notification information generated in another application (e.g., a SMS/MMS application, an e-mail application, a healthcare management application, or an environment information application) of the electronic device 10 to the external electronic device (e.g., the external electronic device 104). Additionally or alternatively, the notification relay application may, for example, receive notification information from the external electronic device (e.g., the external electronic device 104) and provide the notification information to a user. The device management application may manage (e.g., install, delete, or update) a function of at least a part of the external electronic device (e.g., the external electronic device 104) communicating with the electronic device 10 (e.g., turn-on/turn-off of the external electronic device (or a part thereof) or brightness (or resolution) adjustment of the display), an application operating on the external electronic device, or a service (e.g., a call service or a message service) provided on the external electronic device.

According to various embodiments of the present disclosure, the at least one application 134 may include an application designated according to an attribute (e.g., a type) of the external electronic device (e.g., the external electronic device 104). For example, if the external electronic device is an MP3 player, the at least one application 134 may include an application associated with music playback. Similarly, if the external electronic device is a mobile medical device, the at least one application 134 may include an application associated with healthcare. According to some embodiments of the present disclosure, the at least one application 134 may include at least one of application designated in the electronic device 10 and an application received from another electronic device (e.g., the server 106 or the external electronic device (e.g., the external electronic device 104)).

The I/O interface 140 may deliver a command or data input/output from a user through an input/output device (e.g., a sensor, a keyboard, or a touch screen) to the processor 120, the memory 130, and the communication module 160, for example, through the bus 110. For example, the I/O interface 140 may provide data regarding a user's touch input through the touch screen to the processor 120. The I/O interface 140 may output the command or data, received from the processor 120, the memory 130, and the communication module 160 through the bus 110, through an I/O device (e.g., a speaker or a display). The I/O interface 140 may include an audio module.

The display module 150 may display various contents (e.g., a text, an image, video, an icon, or a symbol) to users.

The communication module 160 sets up communication, for example, between the electronic device 10 and an external device (e.g., a first external electronic device 104 or a server 106). For example, the communication module 160 is connected to a network 162 through wireless or wired communication to communicate with the external device.

The wireless communication may include at least one of Wireless Fidelity (Wi-Fi), Bluetooth (BT), Near Field Communication (NFC), Global Positioning System (GPS), and cellular communication (e.g., Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). The wired communication may include, for example, at least one of a universal serial bus (USB), a High Definition Multimedia Interface (HDMI), a Recommended Standard (e.g., RS-232), and a Plain Old Telephone Service (POTS).

According to an embodiment of the present disclosure, the network 162 may be a telecommunications network. The communication network may include at least one of a computer network, the Internet, the Internet of things, and a telephone network. According to an embodiment of the present disclosure, a protocol (e.g., a transport layer protocol, a data link layer protocol, or a physical layer protocol) for communication between the electronic device 10 and an external electronic device may be supported in the at least one of application 134, the API 134, the middleware 132, the kernel 131, and the communication module 160.

According to various embodiments of the present disclosure, a controller (not pictured) may include a processor 120 and a memory 130 for storing information required by the processor 120. The controller controls the overall operation of the electronic device 10 as a Central Processing Unit (CPU), and performs an operation for supplying power to an antenna device for wireless communication as will be described below.

The antenna device is included in the display of the electronic device to transmit/receive and process a wireless signal. An electronic device following the 4th-Generation (4G) mobile communication standard such as the LTE communication standard connects to a common-use communication network in various frequency bands. For connection from one electronic device in various frequency bands, an antenna device may include a plurality of antenna portions corresponding to the number of frequency bands.

Wireless communication of the antenna portion may include cellular communication, Wi-Fi, BT, GPS, NFC, and Radio Frequency (RF) communication.

The antenna portion may provide a voice call, a video call, a text service, or an Internet service over a communication network. Each of Wi-Fi, BT, GPS, and NFC is implemented as a module which includes a processor for processing data transmitted and received through a corresponding terminal. According to an embodiment, at least some (e.g., two or more) of the Wi-Fi module, the BT module, the GPS module, and the NFC module may be included in one Integrated Chip (IC) or IC package.

The RF module may transmit and receive, for example, a communication signal (e.g., an RF signal). The RF module may include a transceiver, a Power Amplification Module (PAM), a frequency filter, a Low Noise Amplifier (LNA), or an antenna. According to another embodiment, at least one of the cellular module, the Wi-Fi module, the BT module, the GPS module, and the NFC module may transmit and receive an RF signal through a separate RF module.

Figure 4:
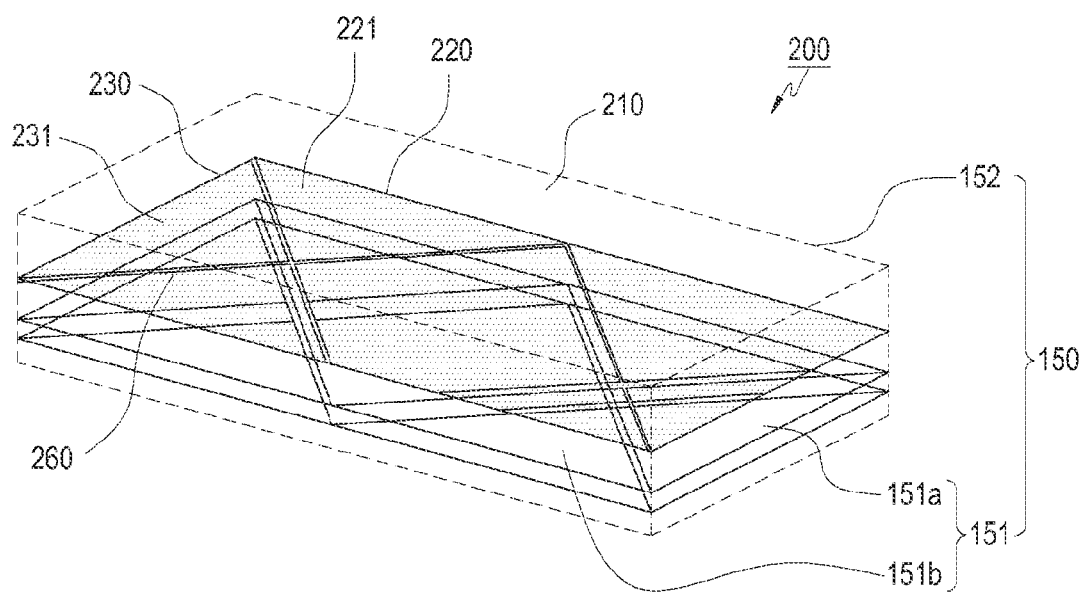
FIG. 4 is an exploded perspective view of an antenna device according to various embodiments of the present disclosure.
Figure 5:
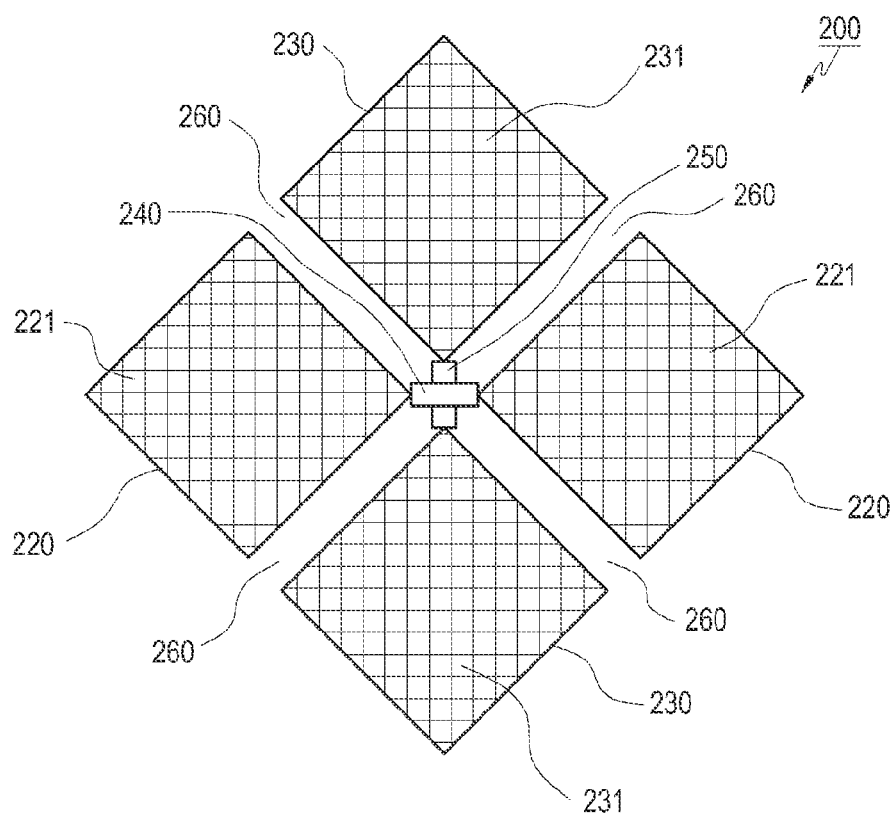
FIG. 5 is an enlarged view of a first antenna portion and a second antenna portion of an antenna device according to various embodiments of the present disclosure.

Herein, as shown in FIGS. 4 and 5 described below, an antenna device 200 according to various embodiments of the present disclosure includes multiple antenna portions 220 and 230 in which a gap 260 is formed to discontinuously dispose mesh-grid regions in a spaced-apart relation, improving visibility of the display 150 and preventing a touch function of the display 150 and radiation performance of the antenna portions 220 and 230 from being degraded. In the following description, the radiation performance of the antenna portion may mean transmission and reception capabilities of the antenna device 200, that is, the capability of the antenna device 200 to receive signals transmitted by other terminals with a minimum loss and the ability of the antenna device 200 to transmit a transmission signal with a minimum loss over the air.

In addition, the antenna device 200 according to various embodiments of the present disclosure will be described with an example of an antenna included in the display 150, but the present disclosure is not limited thereto. That is, the antenna device 200 may be variously applied if it transmits and receives a wireless signal.

Figure 6:
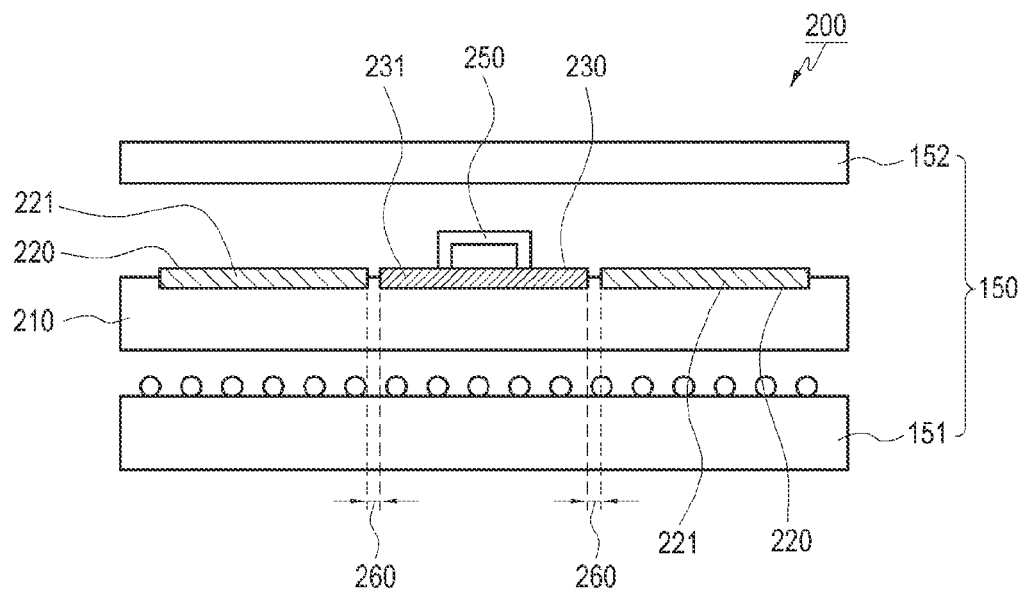
FIG. 6 is an exploded side view of an antenna device according to various embodiments of the present disclosure.

FIG. 4 is an exploded perspective view of the antenna device 200 according to various embodiments of the present disclosure. FIG. 5 illustrates mesh-grid regions 221 and 231 of the antenna device 200 according to various embodiments of the present disclosure. FIG. 6 is an exploded side view of the first antenna portions 220 and the second antenna portions 230 of the antenna device 200 according to various embodiments of the present disclosure.

Referring to FIGS. 4 through 6, the antenna device 200 may include a film member 210 provided on the display 150, first antenna portions 220 and second antenna portions 230, and a first connection portion 240 and a second connection portion 250.

The film member 210 may be provided between a window portion 152 of the display 150 and a touch panel or touch screen panel (TSP) 151 described below. That is, the film member 210 is stacked on the touch panel 151.

The first antenna portions 220 are provided on a top surface of the film member 210 to include the mesh-grid regions 221 having a linear or curved direction.

The second antenna portions 230 are provided on the top surface of the film 210 to include the mesh-grid regions 231 having a right angle or being inclined at a predetermined angle with respect to the mesh-grid direction of the top surface.

The mesh-grid regions 221 and 231 include X-direction and Y-direction mesh-grid regions. The X-direction mesh-grid regions may include the mesh-grid regions having the linear or curved direction. The Y-direction mesh-grid regions may include the mesh-grid regions having the right angle or the predetermined angle with respect to the mesh-grid direction of the top surface.

To electrically connect the mesh-grid regions 221 of the first antenna portions 220, which have the linear or curved direction; the first connection portion 240 is provided between the mesh-grid regions 221 having the linear or curved direction.

To electrically connect the mesh-grid regions 231 of the second antenna portions 230, which have the right angle or are inclined at the predetermined angle with respect to the mesh-grid direction of the top surface, the second connection portion 250 is provided between the mesh-grid regions 231 having a right angle or being inclined at a predetermined angle with respect to the mesh-grid direction of the top surface.

The second connection portion 250 is in a bridge form to electrically connect the mesh-grid regions 231 having a right angle or being inclined at a predetermined angle with respect to the mesh-grid direction of the top surface.

To discontinuously dispose the mesh-grid regions 221 and 231 in a spaced-apart relation between the first antenna portions 220 and the second antenna portions 230, the gap 260 is formed, allowing touch recognition of the touch panel 151 while having the first antenna portions 220 and the second antenna portions 230 on the touch panel 151 of the display 150, and improving antenna performance by preventing the radiation performance of the antenna from degrading, as well as improving visibility of the touch panel 151. Moreover, the touch function of the touch panel 151 and the antenna radiation performance may be implemented at the same time.

Herein, the gap 260 is formed on the first antenna portions 220 and the second antenna portions 230 to induce a capacitance of the touch panel 151.

The film member 210 may include a polyethylene terephthalate (PET) film member. The film member 210 will be described with an example of the PET film member, but is not limited to the example. That is, the film member 210 may also use various materials as well as the PET film member.

The shape of the mesh-grid regions 221 and 231 may be any one of a diamond shape, a circular shape, an oval shape, a trapezoid shape, a triangular shape, a rectangular shape, and a polygonal shape. The shape of the mesh-grid regions 221 and 231 may also be other shapes as well as the above listed shapes.

In the mesh-grid regions 221 and 231, AgNW, Ag nano particles, a metal mesh, Indium Tin Oxide (ITO), graphene, a Carbon Nano Tube (CNT), a Carbon Nano Balloon (CNB), and so forth, which are conductive materials, are used to form grids.

Figure 14A:
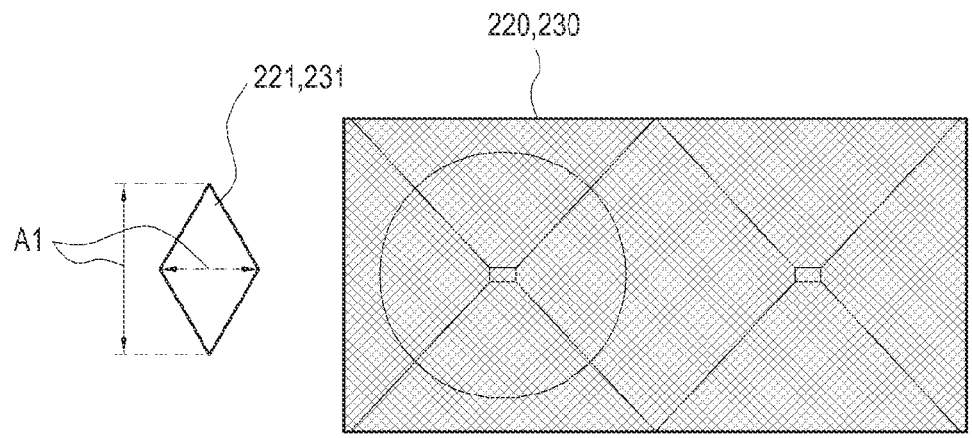
FIG. 14A is a view showing a first antenna portion and a second antenna portion with smaller sizes in an antenna device according to various embodiments of the present disclosure.
Figure 14B:
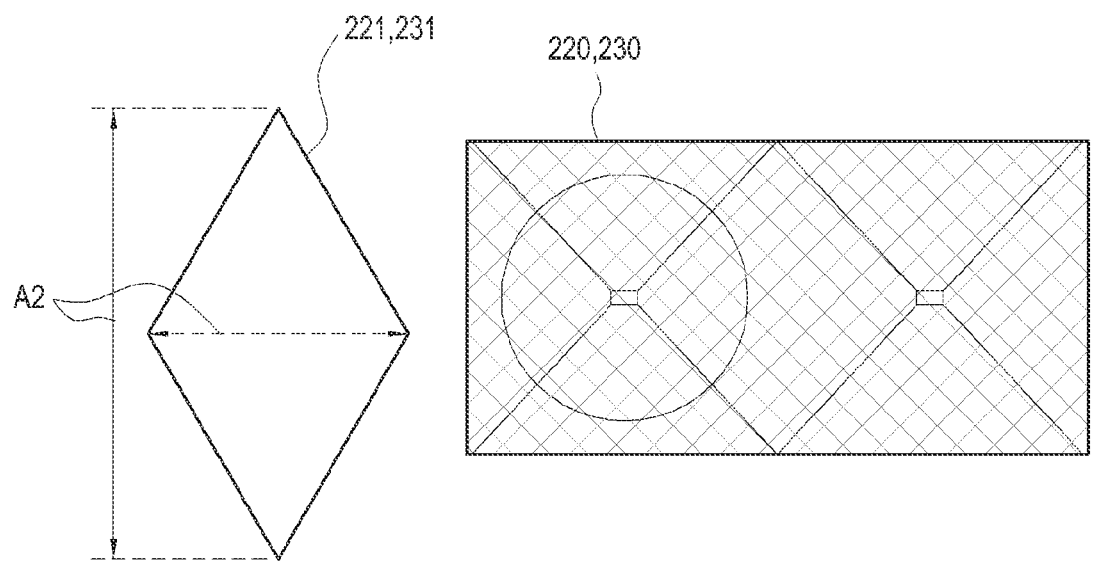
FIG. 14B is a view showing a first antenna portion and a second antenna portion with larger sizes in an antenna device according to various embodiments of the present disclosure.

The size of the mesh-grid regions 221 and 231 may vary to improve the visibility and touch function of the touch panel 151. That is, a size A1 of the mesh-grid regions 221 and 231 may be small as shown in FIG. 14A, and a size A2 of the mesh-grid regions 221 and 231 may be large as shown in FIG. 14B.

Figure 7:
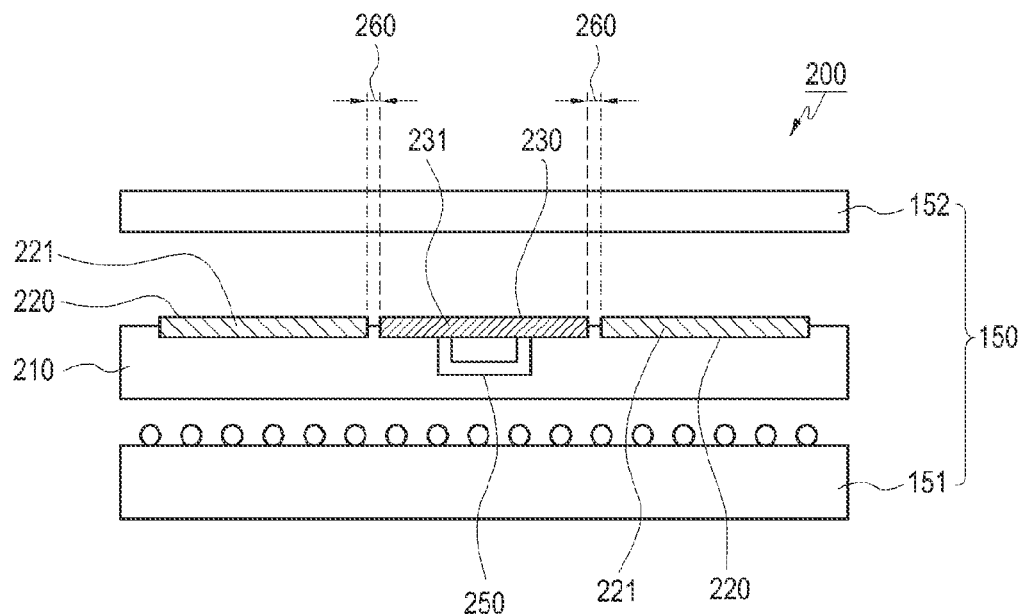
FIG. 7 is an exploded side view of another example of an antenna device according to various embodiments of the present disclosure.

FIG. 7 illustrates another example of the first antenna portions 220 and the second antenna portions 230 according to various embodiments of the present disclosure.

As shown in FIG. 7, the first antenna portions 220 and the second antenna portions 230 may be disposed on a bottom surface of the film member 210. That is, the mesh-grid regions 221 and 231 of the first antenna portions 220 and the second antenna portions 230 may be discontinuously disposed in a spaced-apart relation on the bottom surface of the film member 210 by the gap 260.

Thus, the first antenna portions 220 and the second antenna portions 230 completely discontinuously disposed by the gap 260 in a spaced-apart relation are formed on the bottom surface of the film member 210, and in this state, if the touch panel 151 is touched, the touch panel 151 may prevent cross talk and additional capacitance from being generated between a first electrode 151a (of FIG. 4) and a second electrode 151b (of FIG. 4) provided on the touch panel by the first antenna portions 220 and the second antenna portions 230. Thus, a stable signal is generated between the first electrode 151a (of FIG. 4) and the second electrode 151b (of FIG. 4) and at the same time, a signal applied from the first electrode Tx 151a (of FIG. 4) is read by the second electrode Rx 151b (of FIG. 4), improving the touch function.

Figure 8:
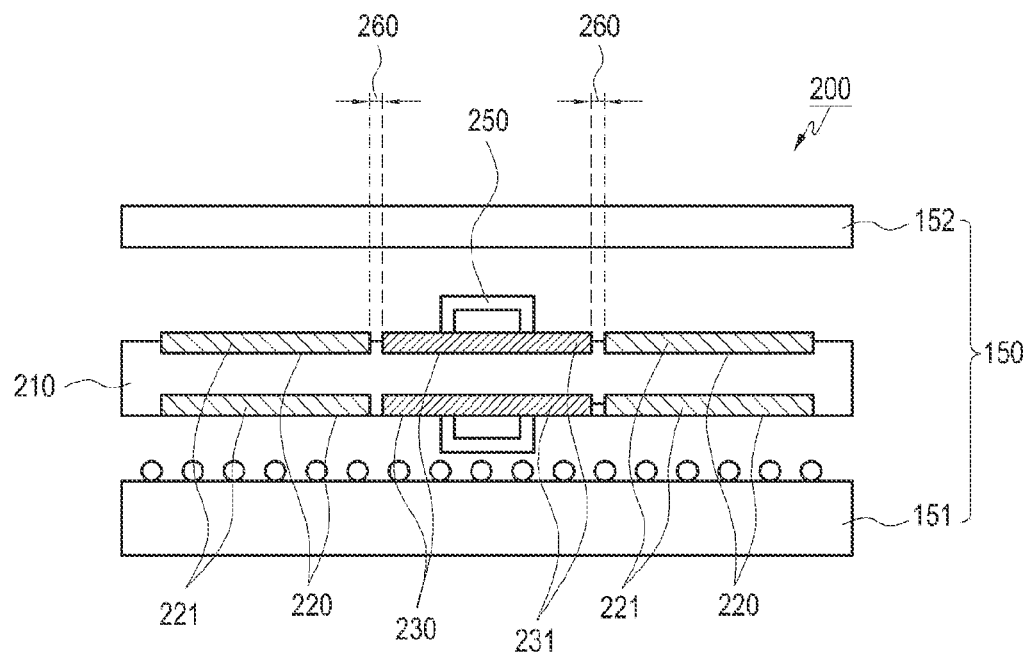
FIG. 8 is an exploded side view of further another example of an antenna device according to various embodiments of the present disclosure.

FIG. 8 is an exploded side view of another example of the first antenna portions 220 and the second antenna portions 230 according to various embodiments of the present disclosure.

As shown in FIG. 8, the first antenna portions 220 and the second antenna portions 230 may be disposed on both the top surface and the bottom surface of the film member 210. That is, the mesh-grid regions 221 and 231 of the first antenna portions 220 and the second antenna portions 230 may be discontinuously disposed by the gap 260 in a spaced-apart relation on the top surface and the bottom surface of the film member 210.

Figure 9:
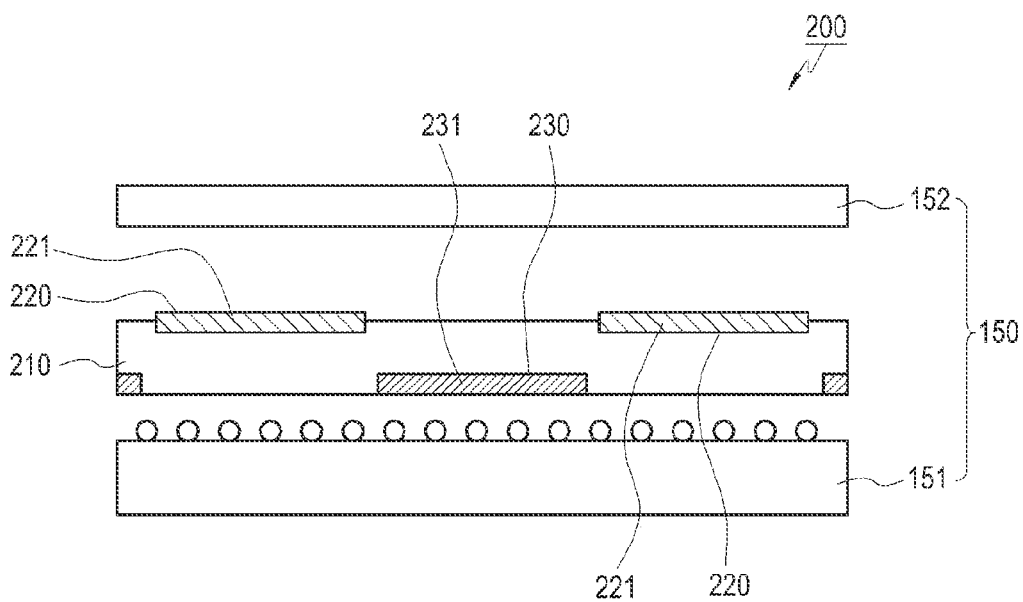
FIG. 9 is an exploded side view of still another example of an antenna device according to various embodiments of the present disclosure.

FIG. 9 illustrates still another example of the first antenna portions 220 and the second antenna portions 230 according to various embodiments of the present disclosure.

As shown in FIG. 9, the first antenna portions 220 are disposed on the top surface of the film member 210 and the second antenna portions 230 are disposed on the bottom surface of the film member 210. That is, the mesh-grid regions 221 of the first antenna portions 220, which have the linear or curved direction, are disposed on the top surface of the film member 210, and the mesh-grid regions 231 of the second antenna portions 230, which have a right angle or being inclined at a predetermined angle with respect to the mesh-grid direction of the top surface, are discontinuously disposed from the mesh-grid regions 221 having the linear or curved direction, on the bottom surface of the film member 210.

That is, the first antenna portions 220 and the second antenna portions 230 are disposed on the top surface and the bottom surface of the film member 210 and at the same time, are discontinuously disposed in a spaced-apart relation, such that when the touch panel 151 is touched, the touch panel 151 may prevent cross talk and additional capacitance from being generated between the first electrode 151a (of FIG. 4) and the second electrode 151b (of FIG. 4) provided on the touch panel by the first antenna portions 220 and the second antenna portions 230 that are discontinuously disposed in a spaced-apart relation. Thus, a stable signal is generated between the first electrode 151a (of FIG. 4) and the second electrode 151b (of FIG. 4) and at the same time, a signal applied from the first electrode Tx 151a (of FIG. 4) is read by the second electrode Rx 151b (of FIG. 4), improving the touch function.

Figure 10:
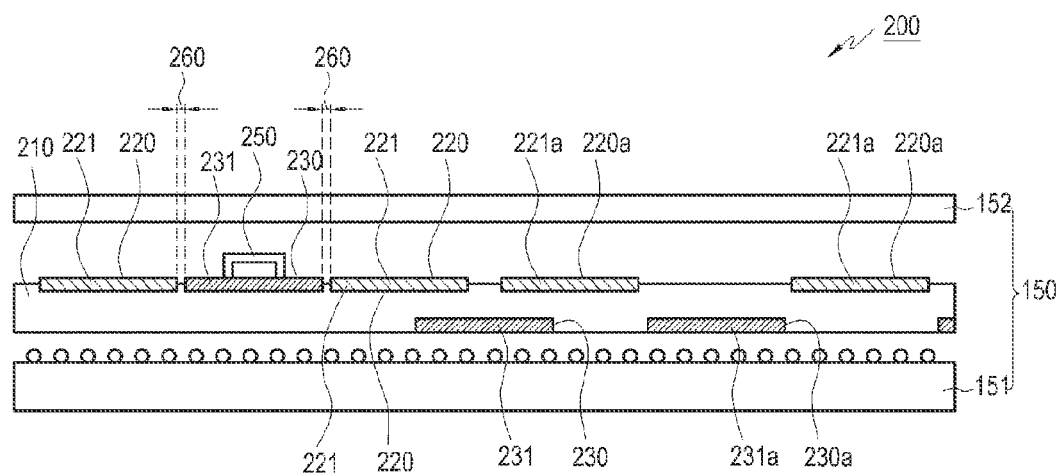
FIG. 10 is an exploded side view of yet another example of an antenna device according to various embodiments of the present disclosure.

FIG. 10 illustrates yet another example of the first antenna portions 220 and the second antenna portions 230 according to various embodiments of the present disclosure.

Figure 11:
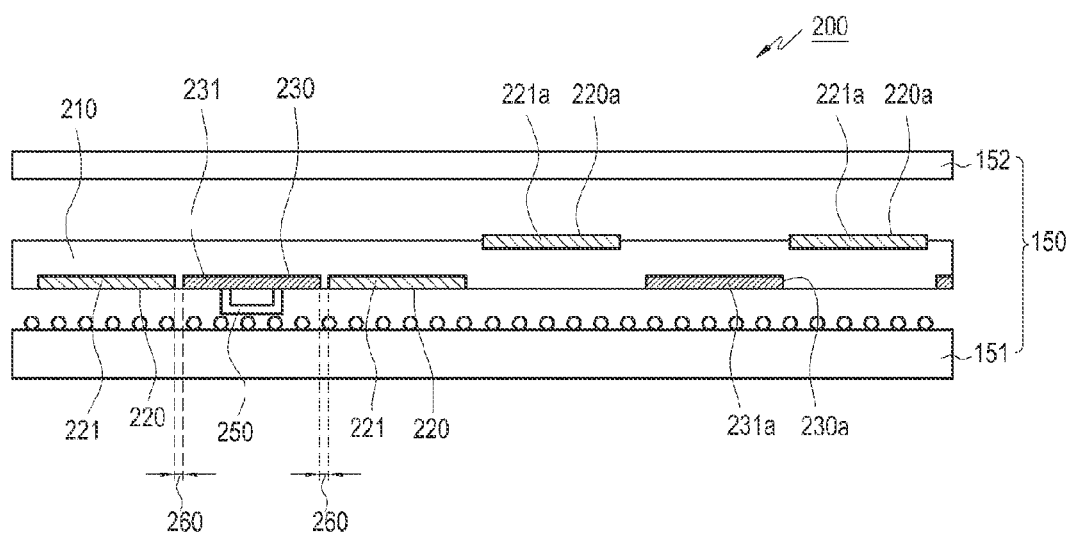
FIG. 11 is an exploded side view of yet another example of an antenna device according to various embodiments of the present disclosure.
Figure 12:
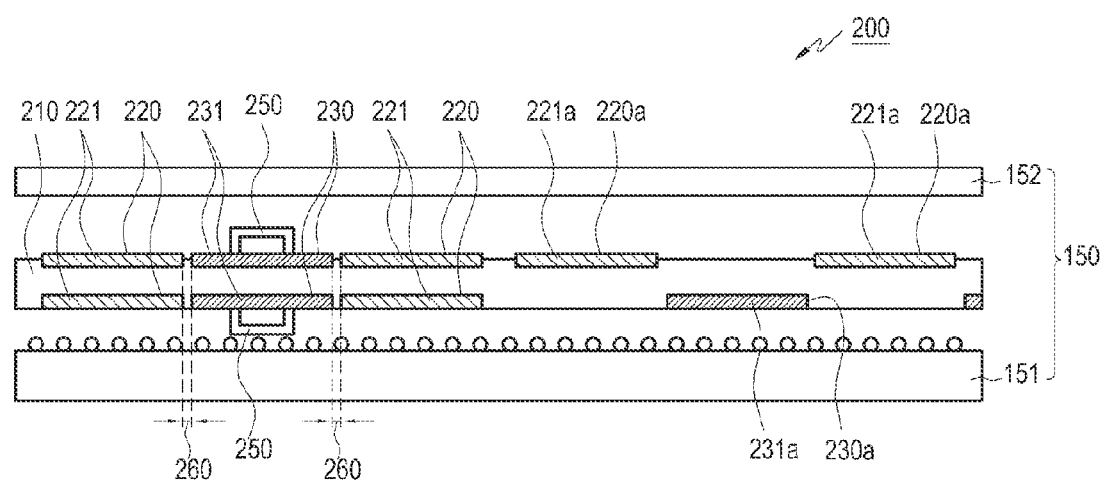
FIG. 12 is an exploded side view of yet another example of an antenna device according to various embodiments of the present disclosure.

As shown in FIGS. 10 through 12, the first antenna portions 220 and the second antenna portions 230 are disposed on the top surface of the film member 210. That is, the mesh-grid regions 221 and 231 of the first antenna portions 220 and the second antenna portions 230 are discontinuously disposed in a spaced-apart relation by the gap 260 on the top surface of the film member 210.

Adjacent to an area where the first antenna portions 220 and the second antenna portions 230 are disposed, other first antenna portion 220a and second antenna portion 230a may be additionally disposed.

The first antenna portion 220a is disposed on the top surface of the film member 210, and the second antenna portion 230a is disposed on the bottom surface of the film member 210. That is, mesh-grid regions 221a of the first antenna portion 220a, which have the linear or curved direction, are disposed on the top surface of the film member 210, and mesh-grid regions 231a of the second antenna portion 230a, which have a right angle or are inclined with respect to the mesh-grid direction of the top surface, are discontinuously disposed in a spaced-apart relation from the mesh-grid regions 221a having the linear or curved direction, on the bottom surface of the film member 210.

That is, the first antenna portion 220a and the second antenna portion 230a may be disposed on the top surface and the bottom surface of the film member 210 and at the same time, be discontinuously disposed in a spaced-apart relation.

Thus, the first and second antenna portions 220 and 230 and the first and second antenna portions 220a and 230a may be disposed together on the film member 210.

FIG. 11 illustrates yet another example of the first antenna portion 220 and the second antenna portion 230 according to various embodiments of the present disclosure.

As shown in FIG. 11, the first antenna portion 220 and the second antenna portion 230 are disposed on the bottom surface of the film member 210. That is, the mesh-grid regions 221 and 231 of the first antenna portion 220 and the second antenna portion 230 are discontinuously disposed in a spaced-apart relation by the gap 260 on the bottom surface of the film member 210.

Adjacent to an area where the first antenna portions 220 and the second antenna portions 230 are disposed, the first antenna portion 220a and the second antenna portion 230a may be additionally disposed.

The first antenna portion 220a is disposed on the top surface of the film member 210, and the second antenna portion 230a is disposed on the bottom surface of the film member 210. That is, the mesh-grid regions 221a of the first antenna portion 220a, which have the linear or curved direction, are disposed on the top surface of the film member 210, and the mesh-grid regions 231a of the second antenna portion 230a, which have a right angle or are inclined with respect to the mesh-grid direction of the top surface, are discontinuously disposed in a spaced-apart relation from the mesh-grid regions 221a on the bottom surface of the film member 210.

That is, the first antenna portion 220a and the second antenna portion 230a are disposed on the top surface and the bottom surface of the film member 210 and at the same time, are discontinuously disposed in a spaced-apart relation.

Thus, the first and second antenna portions 220 and 230 and the first and second antenna portions 220a and 230a may be disposed together on the film member 210.

FIG. 12 illustrates another example of the first antenna portions 220 and the second antenna portions 230 according to various embodiments of the present disclosure.

As shown in FIG. 12, the first antenna portions 220 and the second antenna portions 230 are disposed on the top surface and the bottom surface of the film member 210. That is, the mesh-grid regions 221 and 231 of the first and second antenna portions 220 and 230 are discontinuously disposed in a spaced-apart relation on both the top surface and the bottom surface of the film member 210 by the gap 260.

Adjacent to an area where the first antenna portions 220 and the second antenna portions 230 are disposed, the first antenna portions 220a and the second antenna portions 230a may be further disposed.

The first antenna portions 220a are disposed on the top surface of the film member 210, and the second antenna portions 230a are disposed on the bottom surface of the film member 210. That is, the mesh-grid regions 221a of the first antenna portions 220a, which have the linear or curved direction, are disposed on the top surface of the film member 210, and the mesh-grid regions 231a of the second antenna portions 230a, which have the right angle or are inclined at the predetermined angle with respect to the mesh-grid direction of the top surface, are discontinuously disposed in a spaced-apart relation from the mesh-grid regions 221a having the linear or curved direction, on the bottom surface of the film member 210.

That is, the first antenna portions 220a and the second antenna portions 230a are disposed on the top surface and the bottom surface of the film member 210 and at the same time, are discontinuously disposed in a spaced-apart relation.

Thus, the first and second antenna portions 220 and 230 and the first and second antenna portions 220a and 230a may be disposed together on both the top surface and the bottom surface of the film member 210.

Figure 13:
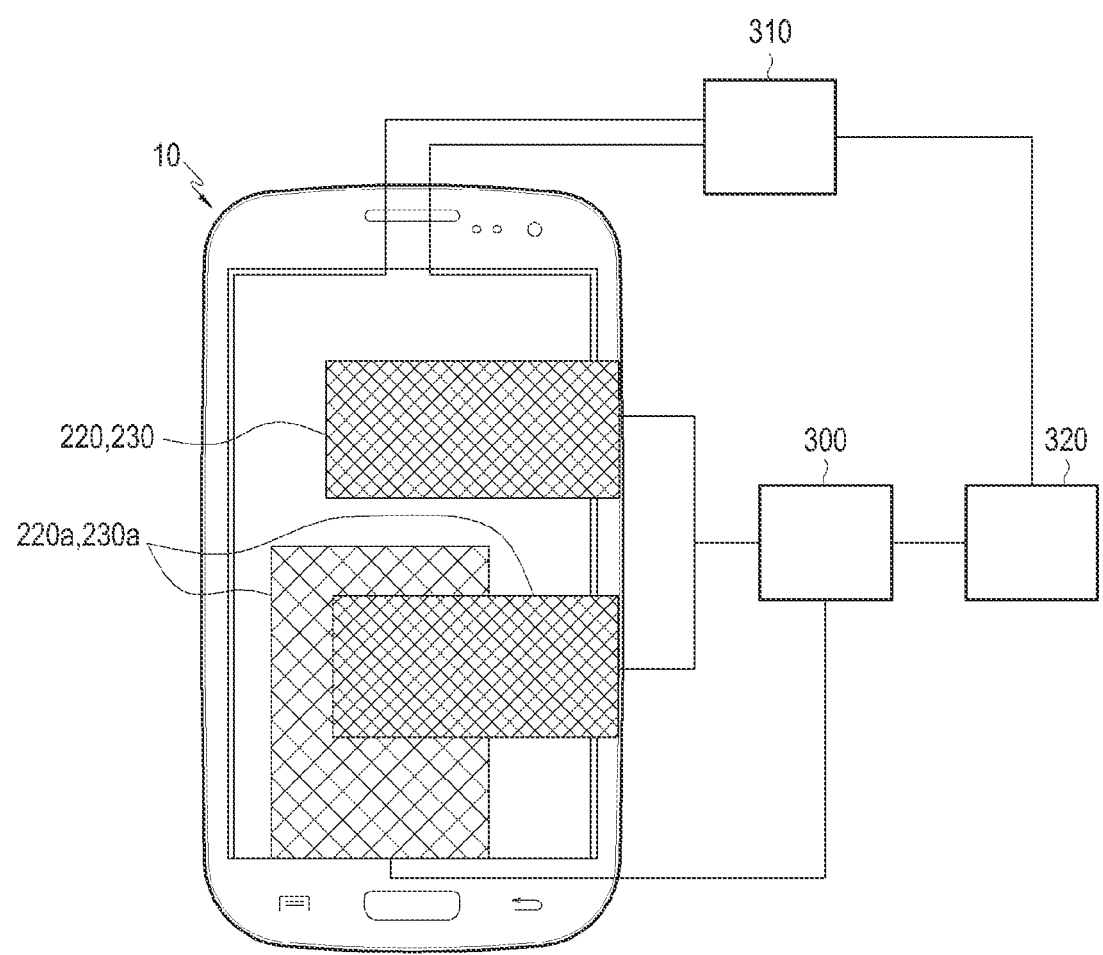
FIG. 13 is a view for describing operations of an antenna device and a display according to various embodiments of the present disclosure.

As shown in FIG. 13, the first and second antenna portions 220 and 230 are disposed on the top surface of the film member 210 (of FIG. 4), and the first and second antenna portions 220a and 230a are disposed adjacent to and in a non-overlapping manner with the first and second antenna portions 220 and 230. The first and second antenna portions 220a and 230a may be disposed on the bottom surface of the first and second antenna portions 220 and 230 in an overlapping manner with the first and second antenna portions 220 and 230.

Thus, the first and second antenna portions 220 and 230 and the first and second antenna portions 220a and 230a may overlap or may not overlap both the top surface and the bottom surface of the film member 210 (of FIG. 4).

A description will now be made of detailed types and operations of the display 150 (e.g., in FIG. 4).

First, a plurality of display (e.g., display 150 in FIG. 4) layers may include a touch panel, and may further include a display panel including any one of a Liquid Crystal Display (LCD) panel, a Light Emitting Diode (LED) panel, an Organic LED (OLED) panel, and an Active Matrix Organic Light Emitting Diode (AMOLED) panel, under the touch panel 151. In the current embodiment, the display 150 may also be applied to another display other than the above described configuration. In the current embodiment, a touch panel 151 will be described as an example.

As shown in FIG. 4, the touch panel 151 refers to a panel that recognizes coordinates of a particular position on the screen, touched with human's fingers or other objects without using a separate input tool or device such as a keyboard, a mouse, or the like and executes a command of software designated corresponding to the touched position to process a particular function. A touch panel technique may be classified into a resistive type and a capacitive type. To implement a capacitive touch screen, the first electrode 151a includes a driving line (Tx) electrode and the second electrode 151b including a sensing line (Rx) electrode need to be configured independently. The first electrode 151a and the second electrode 151b may form a pattern on a single layer or different layers. Intersections between the first electrode 151a and the second electrode 151b have to be separated from one another by an insulator, and each intersection forms one coordinate (X, Y).

The touch panel 151 may be classified into one of an InfraRed (IR) type, a Surface Acoustic Wave (SAW) type, an ElectroMagnetic (EM) type, and an ElectroMagnetic Resonance (EMR) type as well as the resistive type and the capacitive type, depending on driving principles. In the current embodiment, the touch panel 151 of the capacitive type mentioned above will be described.

For example, the first electrode 151a and the second electrode 151b may include ITO (Indium Tin Oxide) in which stannic oxide ($SnO_2$) is added to indium oxide ($In_2O_3$). ITO has higher resistivity and higher transmissivity than existing metallic materials (copper, silver, and so forth).

Moreover, the first electrode 151a and the second electrode 151b may also be formed of a conductive material such as metal mesh, AgNW, or the like as well as ITO. The first electrode 151a and the second electrode 151b may also other materials as well as the above-disclosed conductive material.

Moreover, the shape of the first electrode 151a and the second electrode 151b may include a diamond, a mesh, a snowflake, Kyle, a branch line, a redwood, a diamond ring, a rose, and the like. The first electrode 151a and the second electrode 151b may also have other various shapes as well as the disclosed shape.

As mentioned in FIG. 4, the touch panel 151 of the capacitive type detects a position touched on the display 150 by using a change in capacitance between the sensing line electrode (second electrode) 151b and the driving line electrode (first electrode) 151a. For example, at multiple intersections formed by multiple second electrodes Rx 151b arranged along an X-axis direction (a horizontal-axis direction) and multiple first electrodes Tx 151a arranged along a Y-axis direction (a vertical-axis direction), a capacitance is sequentially measured to sense a change in the capacitance at a particular point. That is, in the touch panel 151 of the capacitive type, when a signal is applied from the first electrode Tx 151a, the other first electrode Tx 151a is maintained at ground GND and all the second electrodes Rx 151b simultaneously read current induced by the capacitance. Next, the signal is applied to the first electrode Tx 151a, and the ground is applied to a previous electrode and the other electrodes, and in this way, the sequential process is performed.

However, if the first and second antenna portions 220 and 230 where the gap 260 is not formed are provided on the touch panel 151 of the capacitive type, additional capacitance is formed due to driving of the first and second antenna portions 220 and 230, failing touch recognition of the touch panel 151. As a result, the touch function of the touch panel 151 degrades.

Therefore, in the current embodiment, the first antenna portion 220 and the second antenna portion 230 completely discontinuously disposed in a spaced-apart relation by the gap 260 are provided on the touch panel 151 as shown in FIGS. 4 and 5. In this state, if the touch panel 151 is touched, the touch panel 151 may prevent cross talk and additional capacitance from being generated between the first electrode 151a and the second electrode 151b by the first antenna portions 220 and the second antenna portions 230 that are discontinuously disposed in a spaced-apart relation. Thus, a stable signal is generated between the first electrode 151a and the second electrode 151b and at the same time, the signal applied from the first electrode Tx 151a is read by the second electrode Rx 151b, improving the touch function.

Moreover, the first antenna portions 220 and the second antenna portions 230 being discontinuously disposed in a spaced-apart relation prevents degradation of radiation performance of the antenna in transmission and reception of the signal of the antenna and also improves the performance of the antenna. Furthermore, the touch function and the antenna radiation performance of the touch panel 151 may be implemented at the same time, and the visibility of the touch panel 151 may be maintained.

The touch panel 151 of the capacitive type may be embedded with the first and second antenna portions 220 and 230 without designing a separate touch Integrated Circuit (IC) 310 (FIG. 13), thus reducing the manufacturing cost of the display 150.

Moreover, as shown in FIG. 13, in the touch panel 151 (of FIG. 4), the first and second antenna portions 220 and 230 and the first and second antenna portions 220a and 230a may be disposed on the top surface of the film member 210 (of FIG. 4) or may overlap the top surface and the bottom surface of the film member 210 (of FIG. 4).

In this state, a Radio Frequency Integrated Circuit (RFIC) 300 is electrically connected with the first and second antenna portions 220 and 230 and the first and second antenna portions 220a and 230a, and is driven to transmit and receive a signal in a corresponding frequency band of each antenna portion.

The RFIC 300 controls driving and is under the control of a controller 320.

Herein, wireless communication of the antenna portion may include and on one of the 2nd-Generation (2G), 3rd-Generation (3G), 4th-Generation (4G), 5th-Generation (5G), WiFi, BT, GPS, NFC, ZigBee, or the like, and the wireless communication has a corresponding frequency band. A detailed frequency band has already been described above and thus will not be described at this time.

The touch IC 310 senses a touch sensitivity change of the touch panel 151 (of FIG. 4) for the corresponding frequency band and at the same time, automatically adjusts its touch sensitivity, when driving the first and second antenna portions 220 and 230.

The controller 320 controls the touch IC 310 to automatically adjust the touch sensitivity of the touch IC 310.

Thus, the touch panel 151 (of FIG. 4) may provide a stable touch function.

Figure 15:
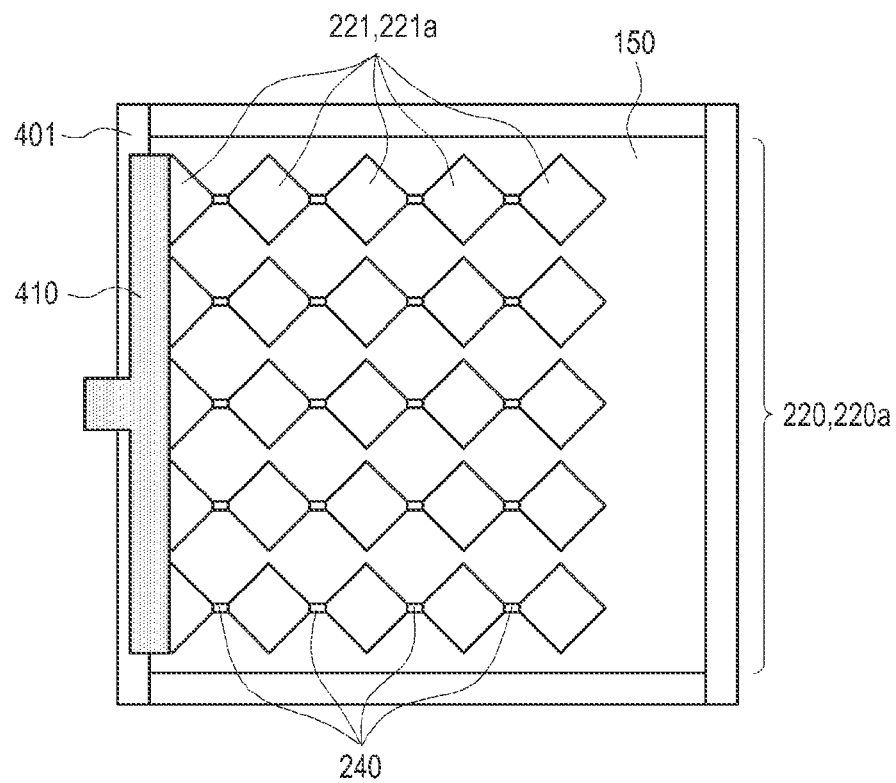
FIG. 15 illustrates a first feeder electrically connected with a first antenna portion in an antenna device according to various embodiments of the present disclosure.
Figure 16:
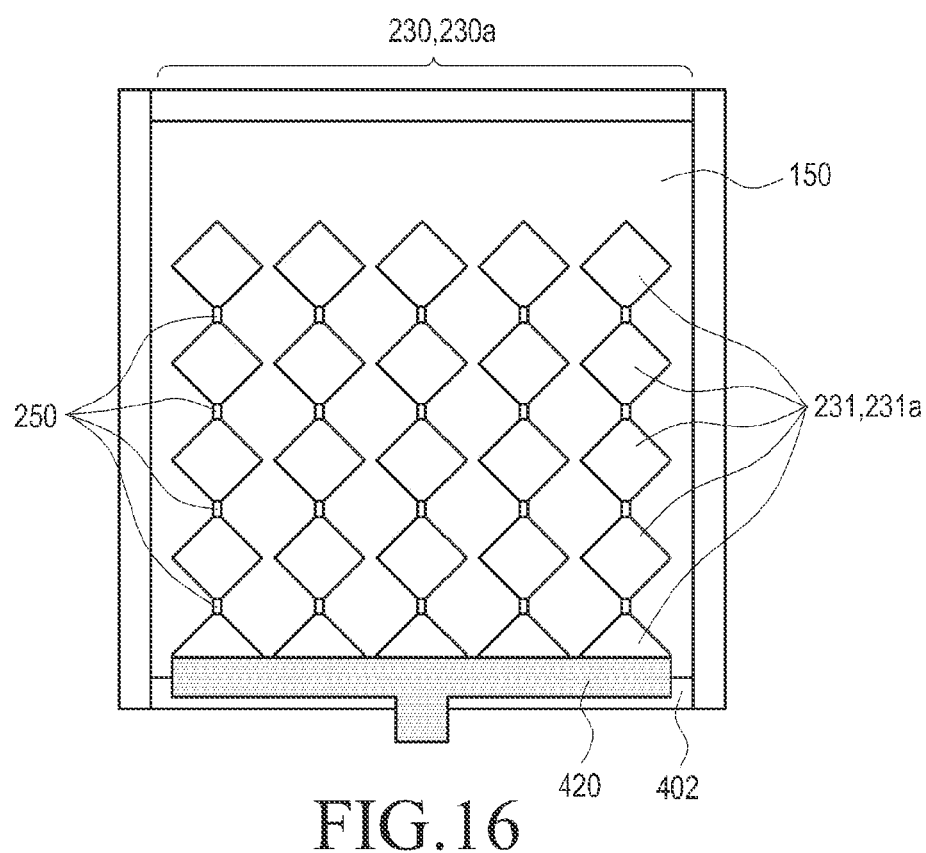
FIG. 16 illustrates a second feeder electrically connected with a second antenna portion in an antenna device according to various embodiments of the present disclosure.
Figure 17:
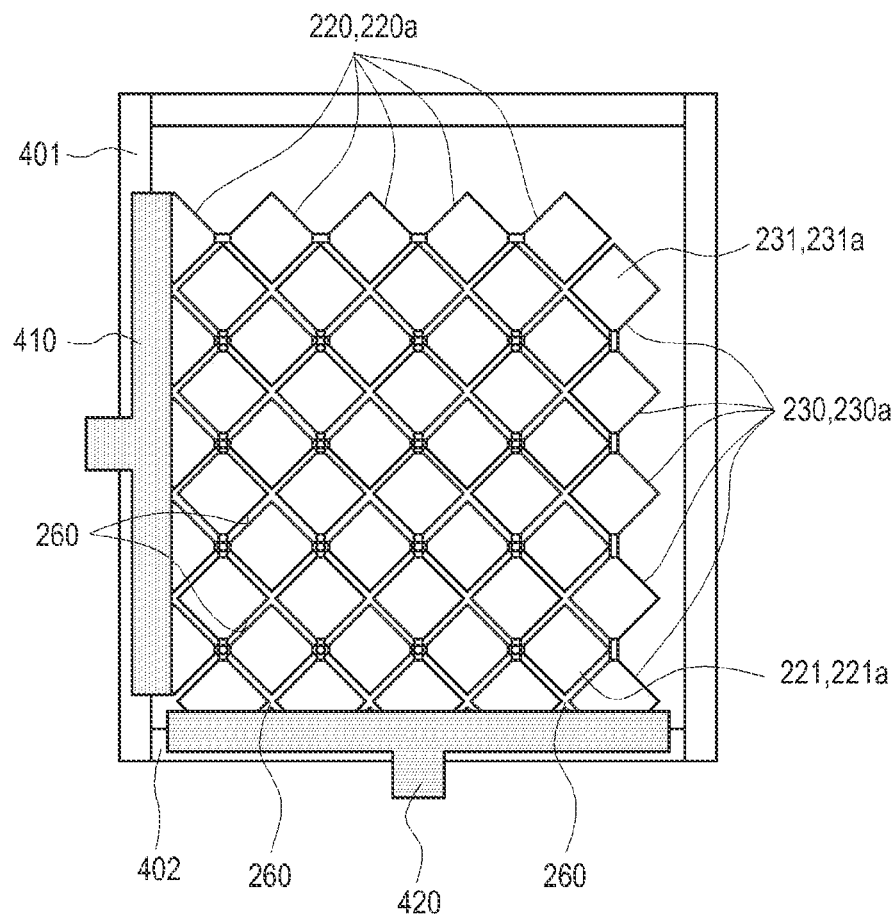
FIG. 17 illustrates a first feeder and a second feeder electrically connected to a first antenna portion and a second antenna portion, respectively, in an antenna device according to various embodiments of the present disclosure.

FIG. 15 illustrates a first feeder electrically connected with a first antenna portion in an antenna device according to various embodiments of the present disclosure. FIG. 16 illustrates a second feeder electrically connected with a second antenna portion in an antenna device according to various embodiments of the present disclosure. FIG. 17 illustrates first and second feeder electrically connected with first and second antenna portions in an antenna device according to various embodiments of the present disclosure.

As shown in FIG. 15, the first antenna portions 220 and 220a may include a first feeder 410 provided on a side surface 401 of an edge of the display 150 to supply power through electric connection or electric coupling between a circuit board (not shown) provided on the electronic device 10 (of FIG. 1) and the mesh-grid regions 221 and 221a having the linear or curved direction.

As shown in FIG. 16, the second antenna portions 230 and 230a may include a second feeder 420 provided on a side surface 402 of the edge of the display 150 to supply power through electric connection or electric coupling between a circuit board (not shown) provided on the electronic device 10 (of FIG. 1) and the mesh-grid regions 231 and 231a, which have a right angle or are inclined with respect to the mesh-grid direction of the top surface.

As shown in FIG. 17, the first and second antenna portions 220, 220a, 230, and 230a are coupled to one another, and at the same time, their mesh-grid regions 221, 221a, 231, and 231a are discontinuously disposed in a spaced-apart relation by the gap 260.

As shown in FIGS. 15 and 16, the mesh-grid regions 221, 221a, 231, and 231a are electrically connected by the first connection portion 240 and the second connection portion 250.

Referring to FIG. 17, at one end of the mesh-grid regions 221, 221a, 231, and 231a, the first feeder 410 and the second feeder 420 may be provided on the side surface 401 and the side surface 402 of the edge of the display 150 (of FIG. 4).

The first feeder 410 and the second feeder 420 may supply power to operate the antenna through electrical connection or electric coupling between the circuit board (not shown) provided on the electronic device 10 (of FIG. 1) and the mesh-grid regions.

Thus, the first antenna portions 220 and the second antenna portion 230 supply power to the mesh-grid regions 221, 221a, 231, and 231a through the first feeder 410 and the second feeder 420, thus transmitting and receiving a signal of the antenna and driving the antenna without radiation performance degradation.

According to various embodiments of the present disclosure, by forming multiple antenna portions between which a gap is formed to discontinuously dispose mesh-grid regions in a spaced-apart relation on a display of an electronic device, improves touch recognition of a touch panel provided in the display and prevents a touch function from being degraded and radiation performance of the antenna from being degraded due to an improvement of an antenna function. Moreover, improving a touch function and radiation performance of the electronic device may be implemented at the same time.

Other effects that may be obtained or expected from the embodiments of the present disclosure are explicitly or implicitly disclosed in the detailed description of the embodiment of the present disclosure. For example, various effects expected from the embodiments of the present disclosure have been disclosed in the detailed description of the present disclosure.

The embodiments of the present disclosure provided in the present specification and the drawings merely provide particular examples to easily describe the technical contents of the present disclosure and to facilitate understanding of the present disclosure, rather than to limit the scope of the embodiments of the present disclosure. Thus, the scope of the embodiments of the present disclosure should be construed as including any changes or modifications derived from the technical spirit of the embodiments of the present disclosure as well as the embodiments described herein.

What is claimed is:

1. An antenna device embedded in a display, the antenna device comprising:
a film member provided between a plurality of display layers; and
multiple antenna portions comprising mesh-grid regions provided on the film member,
wherein a gap is formed between the multiple antenna portions such that the mesh-grid regions are discontinuously disposed in a spaced-apart relation.

2. The antenna device of claim 1, wherein the multiple antenna portions are disposed on a top surface of the film member.

3. The antenna device of claim 1, wherein the multiple antenna portions are disposed on a bottom surface of the film member.

4. The antenna device of claim 1, wherein the multiple antenna portions are disposed on both a top surface and a bottom surface of the film member.

5. The antenna device of claim 1, wherein on the multiple antenna portions, the mesh-grid regions having at least one of a linear direction and a curved direction are disposed on a top surface of the film member, and the mesh-grid regions at least one of having at least one of a right angle with respect to a mesh-grid direction of the top surface are disposed on a bottom surface of the film member, and being inclined at a predetermined angle with respect to the mesh-grid direction of the top surface are disposed on the bottom surface of the film member.

6. The antenna device of claim 1, wherein the multiple antenna portions are disposed on a top surface of the film member, and on at least one of the multiple antenna portions the mesh-grid regions having at least one of a linear and a curved direction is provided on the top surface of the film member, and the mesh-grid regions at least one of having at least one of a right angle with respect to a mesh-grid direction of the top surface are disposed on a bottom surface of the film member, and being inclined at a predetermined angle with respect to the mesh-grid direction of the top surface are disposed on the bottom surface of the film member.

7. The antenna device of claim 1, wherein the multiple antenna portions are disposed on a bottom surface of the film member, and on at least one of the multiple antenna portions the mesh-grid regions having at least one of a linear and a curved direction is provided on a top surface of the film member, and the mesh-grid regions at least one of having at least one of a right angle with respect to a mesh-grid direction of the top surface are disposed on a bottom surface of the film member, and being inclined at a predetermined angle with respect to the mesh-grid direction of the top surface are disposed on the bottom surface of the film member.

8. The antenna device of claim 1, wherein the multiple antenna portions are disposed on both a top surface and a bottom surface of the film member, and on at least one of the multiple antenna portions the mesh-grid regions having at least one of a linear or a curved direction is provided on the top surface of the film member, and the mesh-grid regions at least one of having a right angle with respect to a mesh-grid direction of the top surface are disposed on a bottom surface of the film member, and being inclined at a predetermined angle with respect to the mesh-grid direction of the top surface are disposed on the bottom surface of the film member.

9. The antenna device of claim 1, wherein the plurality of display layers comprises a touch panel and further comprises, under the touch panel, a display panel comprising any one of a Liquid Crystal Display (LCD) panel, a Light Emitting Diode (LED) panel, an Organic LED (OLED) panel, and an Active Matrix Organic Light Emitting Diode (AMOLED) panel.

10. The antenna device of claim 1, wherein the gap is formed to induce a capacitance of a touch panel.

11. The antenna device of claim 1, wherein the film member is formed of a polyethylene terephthalate (PET) film member.

12. The antenna device of claim 1, wherein a shape of the mesh-grid regions is one of a diamond shape, a circular shape, an oval shape, a trapezoid shape, a triangular shape, a rectangular shape, and a polygonal shape.

13. The antenna device of claim 1, wherein in the mesh-grid regions, AgNW, Ag nano particles, a metal mesh, Indium Tin Oxide (ITO), graphene, a Carbon Nano Tube (CNT), and a Carbon Nano Balloon (CNB), which are conductive materials, are used to form a grid.

14. The antenna device of claim 1, wherein a size of the mesh-grid regions is variable.

15. The antenna device of claim 1, wherein the multiple antenna portions are overlapped with a top surface and a bottom surface of the film member.

16. The antenna device of claim 1, wherein the multiple antenna portions are provided at an edge of the display and comprise multiple feeders to supply power through an electrical connection or electric coupling between a circuit board provided in an electronic device and the mesh-grid regions.

17. The antenna device of claim 1, further comprising:
a film member provided on the display;
multiple first antenna portions provided on a top surface of the film member comprising mesh-grid regions having at least one of a linear and a curved direction;
multiple second antenna portions provided on the top surface of the film member comprising mesh-grid regions at least one of having at least one of a right angle with respect to a mesh-grid direction of the top surface, and being inclined at a predetermined angle with respect to the mesh-grid direction of the top surface; and
a first connection portion and a second connection portion configured to electrically connect the multiple first antenna portions with the multiple second antenna portions,
wherein a gap is formed between the first antenna portions and the second antenna portions such that the mesh-grid regions are discontinuously disposed in a spaced-apart relation.

18. The antenna device of claim 17, wherein the antenna portions comprise a first feeder and a second feeder provided at an edge of the display,
wherein the first feeder is provided on a side surface of the edge of the display and supplies power through an electric connection or electric coupling between a circuit board provided in an electronic device and the mesh-grid regions having at least one of the linear direction and the curved direction, and
the second feeder is provided on a side surface of the edge of the display and supplies power through an electric connection or electric coupling between the circuit board provided in the electronic device and the mesh-grid regions having at least one of the right angle with respect to the top surface the film member, and being inclined at a predetermined angle with respect to the top surface of the film member.

19. The antenna device of claim 1, further comprising:
a film member provided on the display;
multiple first antenna portions provided on a top surface of the film member comprising mesh-grid regions having at least one of a linear and curved direction;
multiple second antenna portions provided on a bottom surface of the film member comprising mesh-grid regions having at least one of a right angle with respect to the top surface of the film member, and being inclined at a predetermined angle with respect to the top surface of the film member; and
a first connection portion and a second connection portion configured to electrically connect the multiple first antenna portions with the multiple second antenna portions,
wherein the multiple first and second antenna portions discontinuously dispose the mesh-grid regions in a spaced-apart relation on the top surface and the bottom surface of the film member.

20. The antenna device of any one of the preceding claims, wherein the antenna device comprises an electronic device.

21. The antenna device of claim 20, comprising:
a Radio Frequency Integrated Circuit (RFIC) configured to drive multiple antenna portions for transmission and reception in corresponding frequency bands of the multiple antenna portions;
a touch Integrated Circuit (IC) configured to sense a change in a touch sensitivity of a touch panel for a corresponding frequency band and automatically adjust the touch sensitivity when the multiple antenna portions are driven by the RFIC; and
a controller configured to control driving the RFIC and the automatic adjustment of the touch sensitivity of the touch IC.

* * * * *